March 20, 1928. 1,662,818
F. G. BROTZ
COVER FOR DISHWASHERS AND THE LIKE
Filed July 6, 1926 2 Sheets-Sheet 1
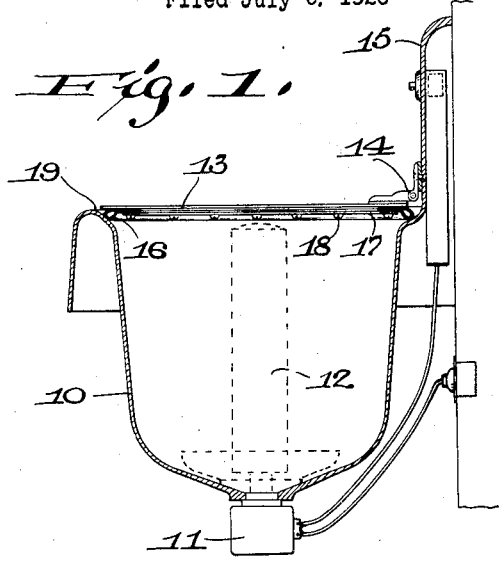
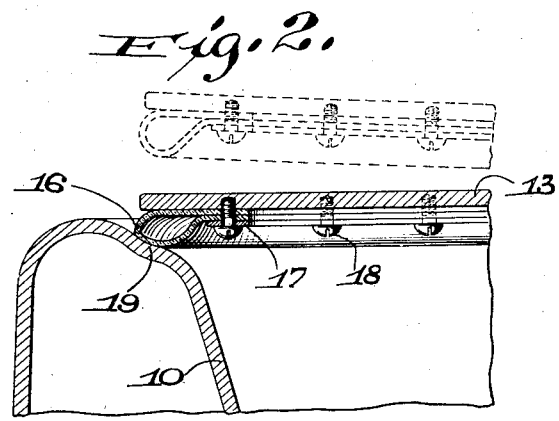
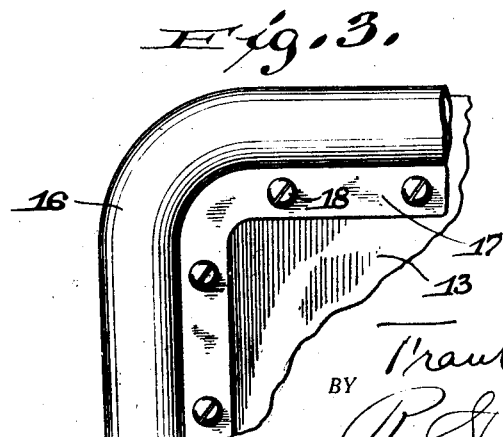
WITNESSES
INVENTOR
Frank G. Brotz
BY
ATTORNEY.

March 20, 1928.  1,662,818
F. G. BROTZ
COVER FOR DISHWASHERS AND THE LIKE
Filed July 6, 1926  2 Sheets-Sheet 2
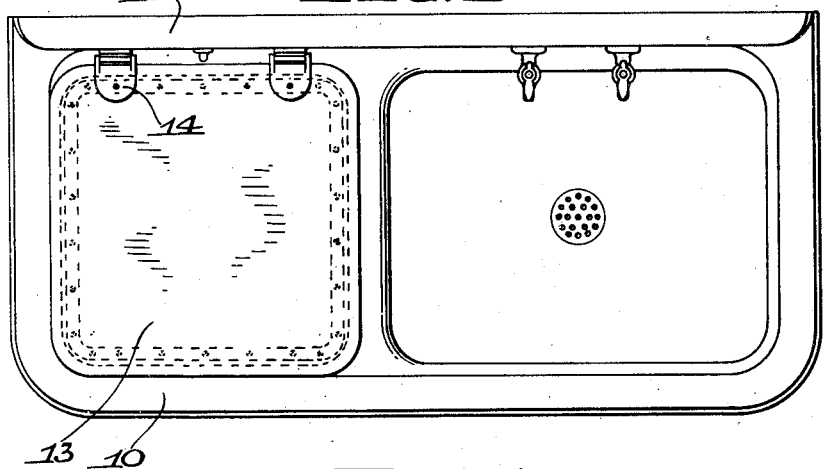
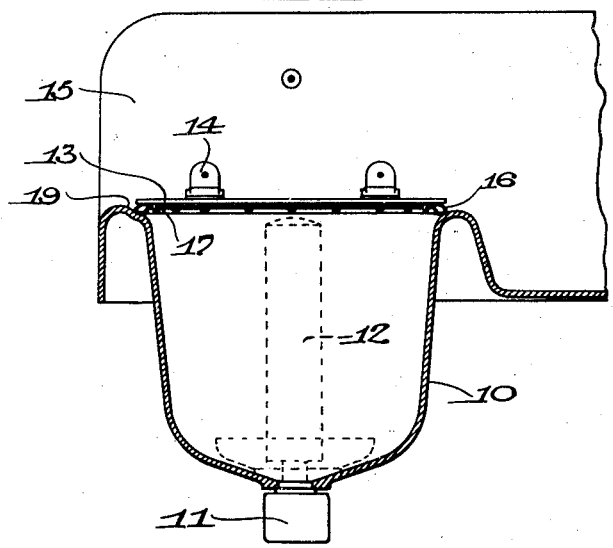
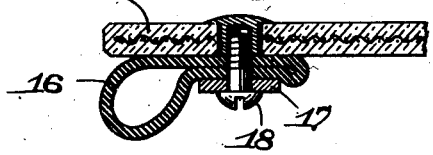
WITNESSES
INVENTOR
Frank G. Brotz
ATTORNEY Patented Mar. 20, 1928.

1,662,818

UNITED STATES PATENT OFFICE.

FRANK G. BROTZ, OF KOHLER, WISCONSIN, ASSIGNOR TO KOHLER COMPANY, OF KOHLER, WISCONSIN, A CORPORATION OF WISCONSIN.

COVER FOR DISHWASHERS AND THE LIKE.

Application filed July 6, 1926. Serial No. 120,786.

This invention has for its object to provide a cover for plumbing fixtures such as dishwashers, clothes washers, laundry tubs, etc., and having a rubber cushion forming a yielding tight fitting sealing closure to prevent water being splashed or forced out of the receptacle and to protect the vitreous enameled surface of the fixture and to permit of such cover being used as a drain board when desired.

With the above and other objects in view the invention consists in the cover for dishwashers and the like as herein claimed and all equivalents.

Referring to the accompanying drawings, in which like characters of reference indicate the same parts in different views, Fig. 1 is a vertical sectional view of a dishwasher provided with a rubber cushion cover constructed in accordance with this invention;

Fig. 2 is a detail sectional view thereof showing in dotted lines the expansion of the rubber cushion when the cover is raised;

Fig. 3 is a plan view of a corner of the cover showing the manner of attaching the cushion thereto;

Fig. 4 is a plan view of the combination sink and dishwasher;

Fig. 5 is a front sectional view thereof, and

Fig. 6 is a detail of a modification of the rubber cushion.

In these drawings, 10 indicates the dishwasher receptacle of a combination dishwasher and sink of a type in present use, the motor 11 thereof positioned at the bottom and driving rotating dishwashing mechanism 12 indicated in dotted lines.

A cover 13, which may be of glass or metal, as shown, such as aluminum plate, is mounted on hinges 14 on the back panel 15 of the porcelain fixture and is adapted to make a tight fitting closure with the rim surrounding the receptacle 10 to confine the water thereto. To obtain such tight sealing fit notwithstanding irregularities in the porcelain enameled surface of the fixture a soft rubber cushion 16 is provided around the edge of the cover capable of adapting itself to the irregularities of the surface.

The rubber cushion may constitute a rubber tube, as shown in Fig. 6, but is preferably formed of a rubber sheet bent so that its edges lie together between the bottom of the cover 13 and a metal clamping frame 17. The screws 18, which pass through said frame and through both edges of the rubber sheet and are threaded into the cover as shown in Fig. 2, securely clamp said edges of the rubber between the frame and cover so that it forms an air chambered cushion sufficiently soft to be distorted under the weight of the cover and adapt itself to fit the rim of the receptacle.

This rubber air cushion not only effects a tight sealing closure for the receptacle that will prevent water being forced or splashed out of the receptacle during the operation of the dishwashing machine, but it forms a cushion for the cover when the latter is dropped, the air confined in the receptacle thereby constituting an air cushion at such times.

Preferably the rim of the fixture has a waved surface, as shown at 19, to form a seat for the rubber cushion of the cover, the cushion extending beyond the edge of the cover as shown.

What I claim as new and desire to secure by Letters Patent is:

1. A dishwashing machine or the like comprising a receptacle having a surrounding rim, a cover hinged to seat on the rim, an air cushion secured to the edge of the cover and engaging the rim of the receptacle and comprising a sheet of rubber with its edges in superposed relation and clamped to the cover to form an air chamber therein between the edge of the cover and the rim and a clamping frame for the air cushion surrounded by the air chamber.

2. In a dishwashing machine or the like, a container having a rim forming a cover seat surrounding the container, a hinged cover adapted to close on said seat, and a rubber cushion surrounding the edge of the cover and comprising a strip of sheet rubber with its edges brought together, a clamping frame bearing on said edges, screws passing through the clamping frame and the edges of the rubber and engaging the cover for clamping the rubber between the frame and the cover, said rubber forming an air cushion between the edge of the cover and the rim of the receptacle conforming to the irregularities in the surface of the receptacle to form an air and water-tight sealing closure therewith.

In testimony whereof I affix my signature.

FRANK G. BROTZ.